Jan. 2, 1940.  A. G. MESTLER  2,185,862

FILM FEEDING MECHANISM

Filed Oct. 8, 1938

INVENTOR
ARTHUR G. MESTLER
BY
ATTORNEY

UNITED STATES PATENT OFFICE 2,185,862

FILM FEEDING MECHANISM

Arthur G. Mestler, Rochester, N. Y.

Application October 8, 1938, Serial No. 234,031

5 Claims. (Cl. 88—18.2)

This invention relates to the mechanism for intermittently feeding the film in moving picture projecting machines and the principal object of the invention is to provide an intermittent feed which is practically silent in its operation.

Another object of the invention is to provide a mechanism for intermittently feeding the film in which the feeding member is in constant driving engagement with the film.

A further object of the invention is to provide a film feeding mechanism in which a constant rotary motion of the feeding member provides an intermittent linear feeding motion on the film.

All these and other objects and attendant advantages of this invention will become more readily apparent from the detailed description thereof which follows, reference being had to the accompanying drawing in which Figure 1 is an enlarged detail perspective view of the sprocket feeding member and its gear drive.

Figure 1:
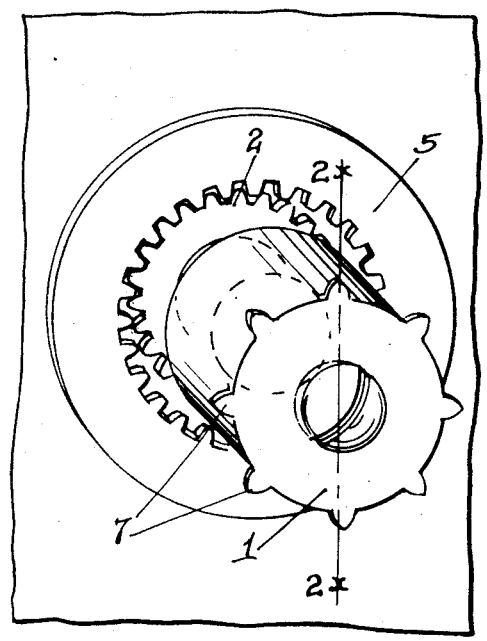
Figure 2:
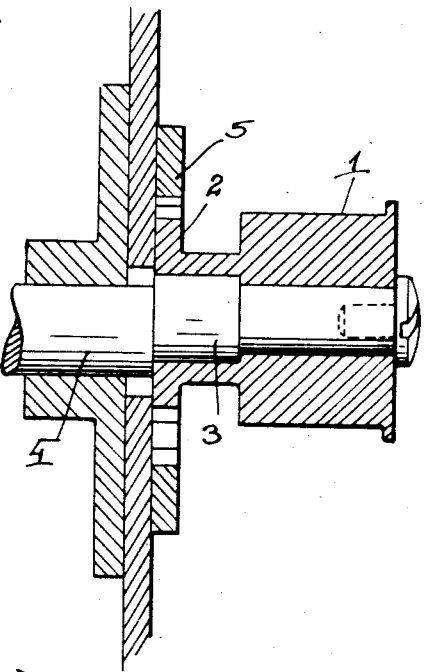
Figure 2 is a longitudinal sectional view of the sprocket feeding member and its driving mechanism, the section being taken on the line 2x—2x of Figure 1.
Figure 3:
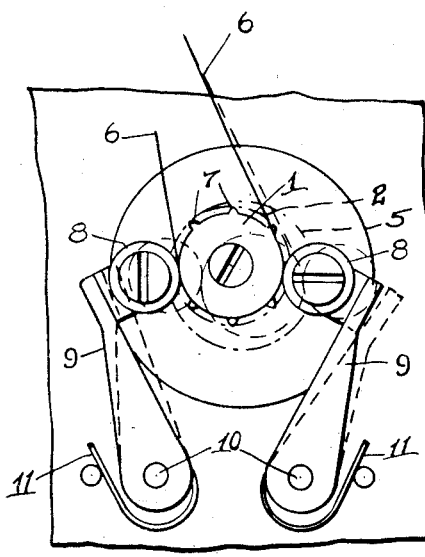
Figure 3 is a front elevation of the intermittent film feeding mechanism.

The intermittent feeding mechanism forming the subject matter of my present invention comprises the film sprocket 1 which carries at its rear the pinion gear 2. Both the sprocket and the gear are mounted to rotate on the crank or eccentric pin 3 which is provided on the end of the drive shaft 4. Surrounding the pinion 2 is the stationary internal gear 5 which is arranged relative to the movement of the crank or eccentric pin 3 so that the rotation of the shaft 4 causes the pinion gear to keep in constant mesh with the stationary internal gear 5. In this way the rotation of the shaft 4 in one direction or as indicated in the drawing to the left in Figure 3 causes the stationary internal gear 5 to rotate the pinion gear 2 and its film sprocket 1 in the opposite direction or to the right in the figures of the drawing.

Figure 5:
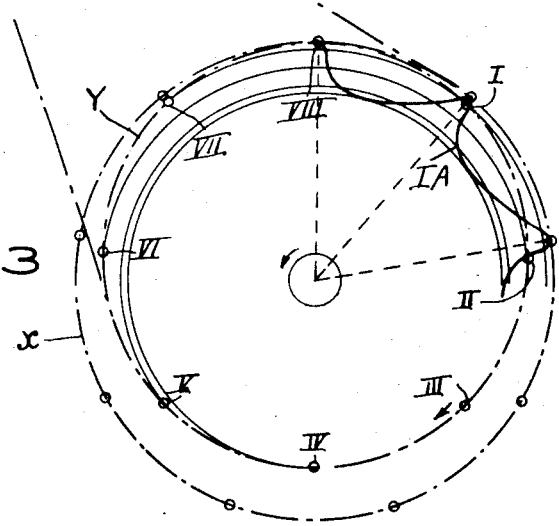
Figure 5 is a diagram illustrating the curves traced by the teeth of the film sprocket in intermittently feeding the film during the rotation of the film sprocket.
Figure 4:
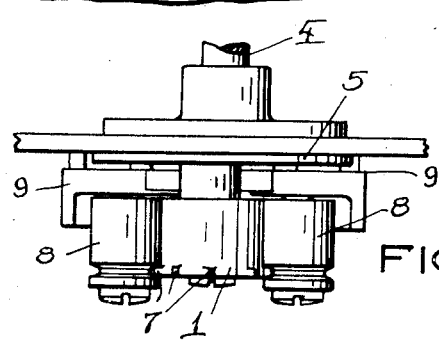
Figure 4 is a top plan view thereof.

The ratio between the pitch diameter of the internal gear and that of the pinion gear is such that for each complete eccentric movement and rotation of the pinion gear within the internal gear the sprocket roller advances the film 6 a distance equal to the vertical side of one image or frame on the film. This is brought about by the eccentric swinging movement of the film sprocket in one direction and its simultaneous rotation in the opposite direction causes the sprocket teeth 7, 7 thereof to describe curves substantially as illustrated in the diagram of Figure 5. In this diagram the outer circle X represents the pitch circle of the internal gear 5 and the inner eccentric circle Y represents the circle described by the end of the teeth on the film sprocket which in theory substantially rolls on the pitch circle of the internal gear. Each of the curves so described as illustrated in Figure 5 comprises an inwardly extending portion which is substantially radial to the film sprocket and is described during one half of the revolution of the pinion gear and a substantially outwardly extending portion which is described during the other half of the same revolution of the pinion gear.

The engagement of a moving sprocket tooth into one of the holes of the film thus allows the film to remain stationary during half of the revolution of the pinion gear, that is while the tooth describes the substantially radial portion of its path after which it draws the film to feed it forward during the other half of the revolution of the pinion gear in which the tooth describes the substantially straight tangential path to the end of its motion.

The film is fed from the gate of the film projecting mechanism which is not shown in the drawing. In its movement thru the gate the film is held by friction so that it remains stationary during the time the tooth does not exert a pull on the film. The slight rearward motion of the tooth from point I to point IA in Figure 5 may cause a back up in the film before it is again pulled forward. However the back up in the film is slight and simply slackens the tension on the film which is quickly taken up on the forward motion of the film.

The film 6 is held in constant mesh with the film sprocket and for this purpose is held wrapped around a portion of it by means of the pressure rollers 8, 8. These rollers are mounted to rotate on the end of the arms 9, 9 which in turn are mounted to swing on the pivot pins 10, 10. Suitable springs 11, 11 operate to move the arms to yieldingly hold the rollers against the perimeter of the film sprocket and at the same time allow the rollers and arms to follow the film sprocket as it eccentrically moves within the internal gear 5.

Points I, II, III, IV, V, VI, VII and VIII on the eccentric circle Y represent the location of the eight sprocket teeth on the film sprocket 1 as illustrated in Figure 5.

While I have shown and described the feeding mechanism as having a film sprocket with a diameter substantially the same as that of the planetary gear pinion, it is understood that the film sprocket may have a smaller or larger diameter without departing from the scope of the invention. Furthermore, the feeding mechanism shown and described may be changed in various ways, and variations may be required under certain conditions, therefore, while some of the constructional details are deemed preferable, it is understood that I do not limit myself to such precise construction, but consider that I am at liberty to make such changes as fairly come within the scope of the appended claims.

I claim:

1. In an intermittent feeding mechanism for feeding film, the combination of a feed sprocket, means for swinging said feed sprocket in a circular path in one direction while rotating said feed sprocket in the opposite direction the intermittent advance of a single sprocket tooth for each circular movement of the sprocket; and means engaging said feed sprocket to hold the film in constant engagement therewith during its swinging and rotary motion thereof and cause an intermittent linear motion of the film.

2. In an intermittent feeding mechanism, the combination of a drive shaft, a crank on one end of said drive shaft, a fixed internal gear concentrically surrounding said drive shaft, a crank pin on said drive shaft, a pinion gear mounted on said crank pin for movement thereby in mesh with said internal gear, a film sprocket rotatably carried by said pinion gear concentric thereto and means for holding a film in driving contact with said film sprocket during its rotary movement with said pinion gear and eccentric motion by said crank pin.

3. An intermittent drive for film, comprising a stationary internal gear, a pinion gear rotatable in a planetary movement in mesh with said internal gear and having a pitch diameter relative to that of the internal gear so as to provide a fractional intermittent rotation of said pinion gear for each planetary movement within said stationary internal gear, a film sprocket adapted to move and rotate with said pinion gear and means for holding a film in constant driving contact with said film sprocket for intermittent linear motion thereby.

4. In an intermittent feeding device for film, a stationary internal gear, a planetary gear meshing with said internal gear and having a pitch diameter relative to the pitch diameter of the internal gear so as to cause a fractional rotation of the planetary gear for each planetary movement thereof, a sprocket carried by said planetary gear concentric thereto and adapted to move therewith in constant engagement with the film to cause each planetary motion combined with the rotary motion of said sprocket to feed the film a predetermined distance over said sprocket.

5. In an intermittent feeding device as set forth in claim 4 including a film drum carried adjacent to said sprocket concentric thereto and means for yieldingly holding the film in engagement with said sprocket and said drum.

ARTHUR G. MESTLER.